(12) United States Patent
McCord et al.

(10) Patent No.: US 12,084,188 B2
(45) Date of Patent: Sep. 10, 2024

(54) MID-PRESSURE WATER COLLECTOR FOR ENVIRONMENTAL CONTROL SYSTEM

(71) Applicant: Hamilton Sundstrand Corporation, Charlotte, NC (US)

(72) Inventors: Patrick McCord, Norwich, CT (US); Donald E. Army, Enfield, CT (US); Liana Frangioni, Windsor Locks, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 203 days.

(21) Appl. No.: 17/538,203

(22) Filed: Nov. 30, 2021

(65) Prior Publication Data
US 2023/0166845 A1 Jun. 1, 2023

(51) Int. Cl.
*B64D 13/00* (2006.01)
*B64D 13/06* (2006.01)

(52) U.S. Cl.
CPC ...... *B64D 13/06* (2013.01); *B64D 2013/0662* (2013.01)

(58) Field of Classification Search
CPC .......... B64D 13/06; B64D 2013/0662; B01D 45/08; B01D 45/16
See application file for complete search history.

(56) References Cited

U.S. PATENT DOCUMENTS

| | | | | |
|---|---|---|---|---|
| 2,835,340 A | | 5/1958 | Mcguff et al. | |
| 3,394,533 A | * | 7/1968 | Sheng Li | B01D 53/26 55/438 |
| 3,707,068 A | * | 12/1972 | Bloom | B01D 45/16 55/396 |
| 3,729,904 A | * | 5/1973 | York | B01D 45/12 55/457 |
| 3,834,126 A | * | 9/1974 | DiMinno, Jr. | F24F 3/14 55/327 |
| 6,331,195 B1 | * | 12/2001 | Faust | B01D 45/16 96/191 |
| 6,709,474 B2 | * | 3/2004 | Zaffetti | B01D 46/2403 55/320 |
| 7,582,143 B2 | * | 9/2009 | Berger | H01M 8/04141 95/52 |

(Continued)

FOREIGN PATENT DOCUMENTS

| EP | 0055060 A1 | 6/1982 |
|---|---|---|
| EP | 3290846 A1 | 3/2018 |

(Continued)

OTHER PUBLICATIONS

Extended European Search Report issued in European Application No. 22205640.0; dated Mar. 20, 2023; 11 pages.

(Continued)

*Primary Examiner* — Sizo B Vilakazi
*Assistant Examiner* — Sherman D Manley
(74) *Attorney, Agent, or Firm* — CANTOR COLBURN LLP (57) ABSTRACT

A water extractor for use in an environmental control system, the water extractor comprising a housing having an inlet end and an outlet end, a swirling mechanism mounted within the housing, and a fog harvester assembly mounted within the housing at a location between the inlet end and the outlet end.

14 Claims, 12 Drawing Sheets

(56) References Cited

U.S. PATENT DOCUMENTS

| | | | | |
|---|---|---|---|---|
| 7,837,752 B2* | 11/2010 | Darke | .................... | B01D 50/20 |
| | | | | 95/268 |
| 9,003,815 B2* | 4/2015 | Al-Ali | .................... | B64D 13/00 |
| | | | | 62/93 |
| 11,058,981 B2 | 7/2021 | Gerlach et al. | | |
| 2008/0047736 A1 | 2/2008 | Levine | | |
| 2008/0271421 A1* | 11/2008 | Darke | ....................... | B04C 3/06 |
| | | | | 55/396 |
| 2009/0139403 A1* | 6/2009 | Darke | .................... | B01D 45/02 |
| | | | | 55/394 |
| 2016/0229541 A1* | 8/2016 | Bruno | .................... | B64D 13/08 |
| 2018/0312263 A1* | 11/2018 | Army | .................... | B64D 13/06 |
| 2020/0392705 A1* | 12/2020 | Boreyko | .................... | E03B 3/28 |

FOREIGN PATENT DOCUMENTS

| | | |
|---|---|---|
| EP | 3130863 B1 | 3/2020 |
| EP | 3467392 B1 | 4/2020 |
| WO | 0153729 A1 | 7/2001 |
| WO | 2005103536 A1 | 11/2005 |
| WO | 2008077887 A2 | 7/2008 |
| WO | 2020084251 A1 | 4/2020 |

OTHER PUBLICATIONS

Extended European Search Report issued in European Application No. 22210011.7; dated Apr. 3, 2023; 7 pages.

\* cited by examiner

MID-PRESSURE WATER COLLECTOR FOR ENVIRONMENTAL CONTROL SYSTEM

BACKGROUND

Embodiments of the present disclosure relate to environmental control systems for a vehicle, and more particularly, to a water collector suitable for use in an environmental control system of an aircraft.

A water collector or water extractor may be provided within an environmental control system to capture or remove free moisture from an airflow. The water collector may include a separation device that directs the moisture present within the airflow to outer walls of the separation device and direct the free moisture towards a drain port. Often times the water collector may be substantially bulky and consume large amounts of space.

BRIEF DESCRIPTION

In an embodiment, a water extractor for use in an environmental control system, the water extractor comprising a housing having an inlet end and an outlet end, a swirling mechanism mounted within the housing, and a fog harvester assembly mounted within the housing at a location between the inlet end and the outlet end.

In addition to one or more of the features described above, or as an alternative to any of the foregoing embodiments the housing includes a diffuser, the fog harvester assembly being arranged at a downstream end of the diffuser.

In addition to one or more of the features described above, or as an alternative to any of the foregoing embodiments the at least one fog harvester assembly includes at least one fog harvester insert, the at least one fog harvester insert including a frame and a condensing material coupled to the frame.

In addition to one or more of the features described above, or as an alternative to any of the foregoing embodiments the fog harvester assembly includes a plurality of fog harvester inserts.

In addition to one or more of the features described above, or as an alternative to any of the foregoing embodiments the plurality of fog harvester inserts are separated from one another along an axis of the housing such that a medium is configured to pass through the plurality of fog harvester inserts in series.

In addition to one or more of the features described above, or as an alternative to any of the foregoing embodiments the condensing material is a wire array.

In addition to one or more of the features described above, or as an alternative to any of the foregoing embodiments the wire array includes a plurality of wires arranged in two rows of wires, each of the plurality of wires within the wire array being separated from a remainder of the plurality of wires.

In addition to one or more of the features described above, or as an alternative to any of the foregoing embodiments the condensing material includes at least one layer of a screen-like material.

In addition to one or more of the features described above, or as an alternative to any of the foregoing embodiments the at least one layer of the screen-like material includes a diamond-like screen material.

In addition to one or more of the features described above, or as an alternative to any of the foregoing embodiments the at least one layer of the screen-like material includes a plurality of layers of screen-like material and adjacent layers of the plurality of layers of screen-like material are vertically offset from one another.

In addition to one or more of the features described above, or as an alternative to any of the foregoing embodiments the at least one fog harvester insert further comprises at least one spacer arranged between adjacent layers of the plurality of layers of screen-like material.

In addition to one or more of the features described above, or as an alternative to any of the foregoing embodiments the frame further comprises a bottom horizontal support having one or more holes formed therein.

In addition to one or more of the features described above, or as an alternative to any of the foregoing embodiments an upper surface of the bottom horizontal support is contoured to direct water droplets toward the one or more holes.

According to an embodiment, an environmental control system of a vehicle includes a component, and a water extractor arranged downstream from and in fluid communication with the component relative to a flow of medium. The water extractor includes a housing having an inlet end and an outlet end and a fog harvester assembly mounted within the housing at a location between the inlet end and the outlet end.

In addition to one or more of the features described above, or as an alternative to any of the foregoing embodiments the vehicle is an aircraft.

In addition to one or more of the features described above, or as an alternative to any of the foregoing embodiments the component is a turbine.

In addition to one or more of the features described above, or as an alternative to any of the foregoing embodiments the housing includes a diffuser, the fog harvester assembly being arranged at a downstream end of the diffuser.

In addition to one or more of the features described above, or as an alternative to any of the foregoing embodiments comprising a swirling mechanism mounted within the housing, upstream from the diffuser.

In addition to one or more of the features described above, or as an alternative to any of the foregoing embodiments the fog harvester assembly includes at least one fog harvester insert, the at least one fog harvester insert including a frame and a condensing material coupled to the frame.

In addition to one or more of the features described above, or as an alternative to any of the foregoing embodiments the fog harvester assembly includes a plurality of fog harvester inserts arranged in series relative to the flow of medium.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
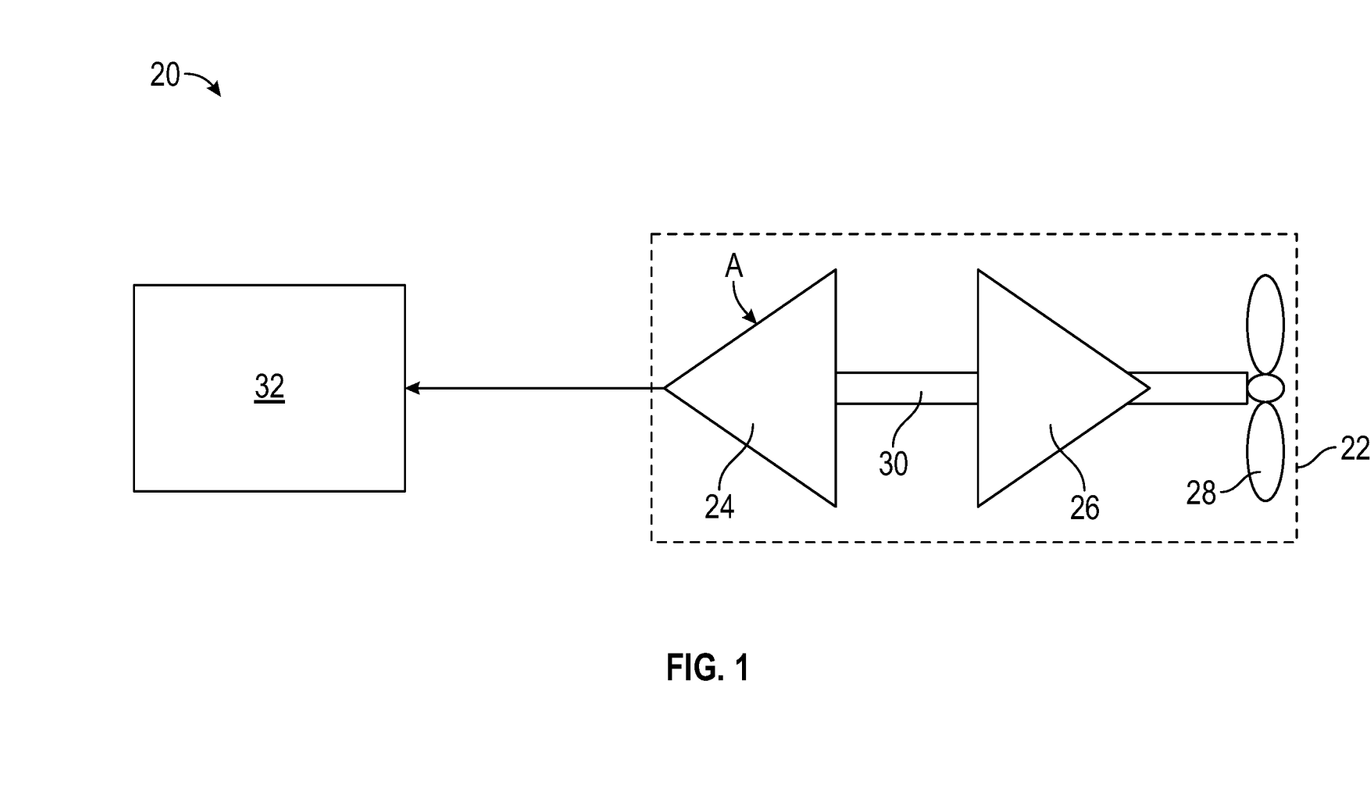
FIG. 1 is a schematic diagram of a portion of an environmental control system according to an embodiment.
Figure 2:
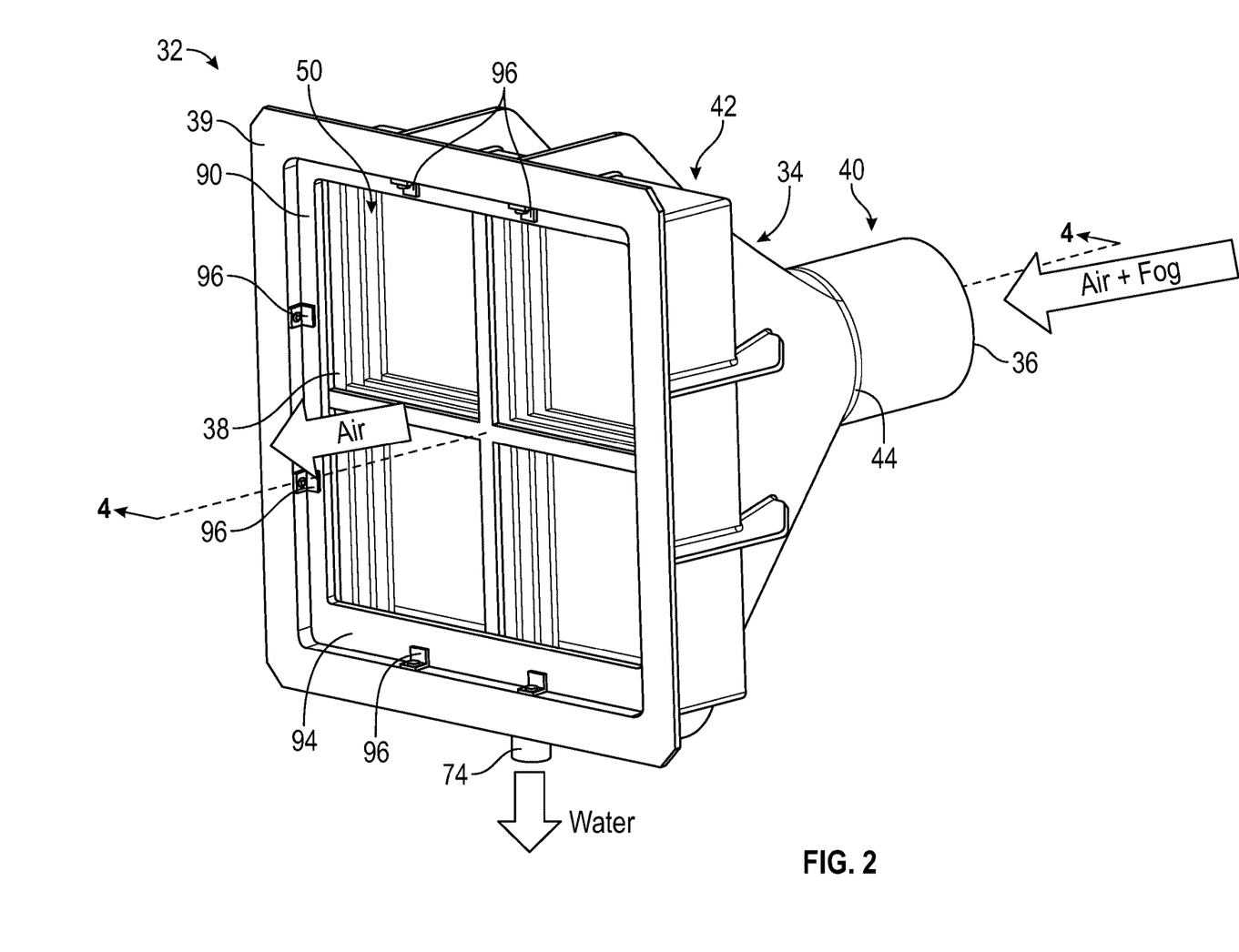
FIG. 2 is a perspective view of a water extractor of an environmental control system according to an embodiment.
Figure 3:
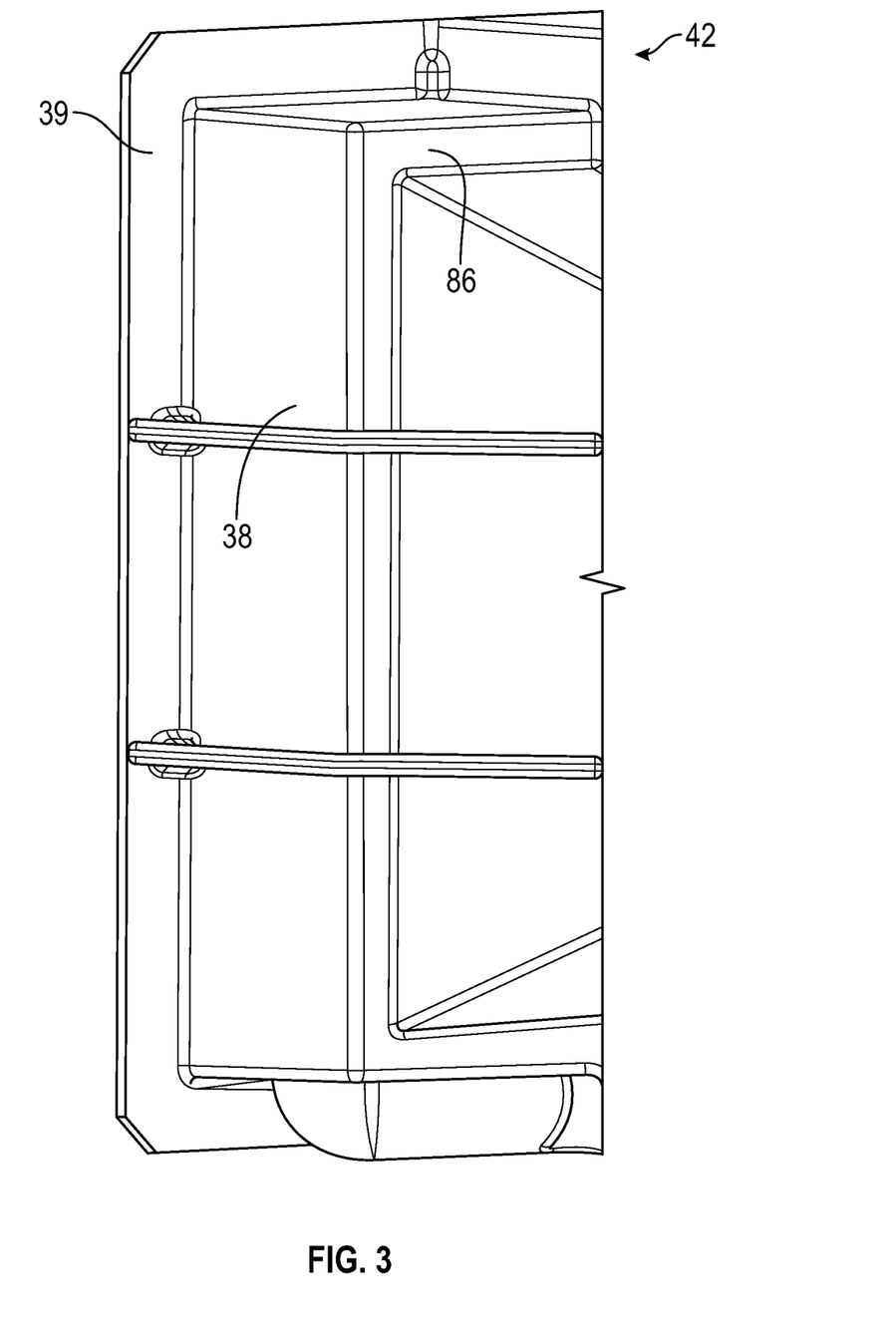
FIG. 3 is a perspective view of a housing of a water extractor according to an embodiment.
Figure 4:
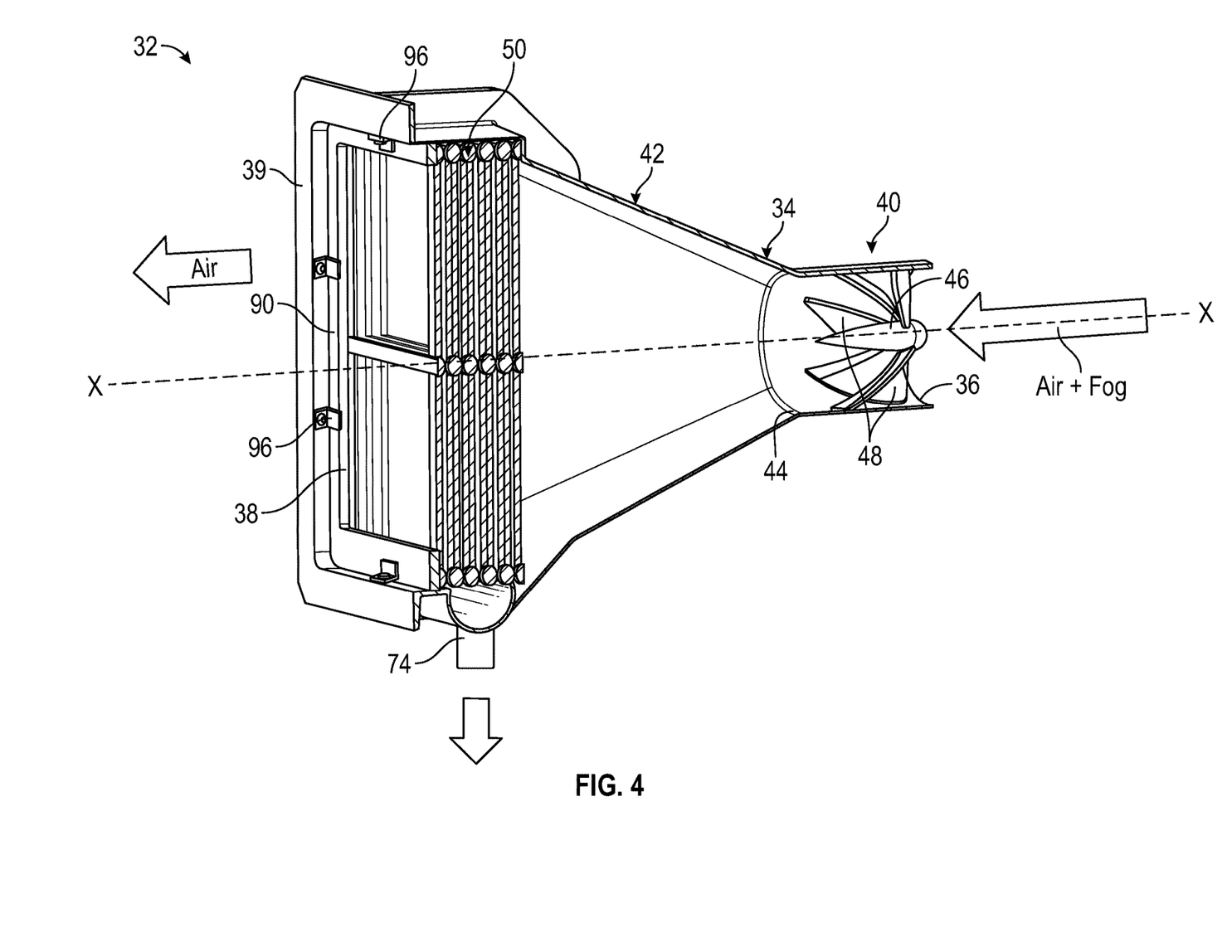
FIG. 4 is a cross-sectional view of the water extractor of FIG. 2 according to an embodiment.
Figure 5:
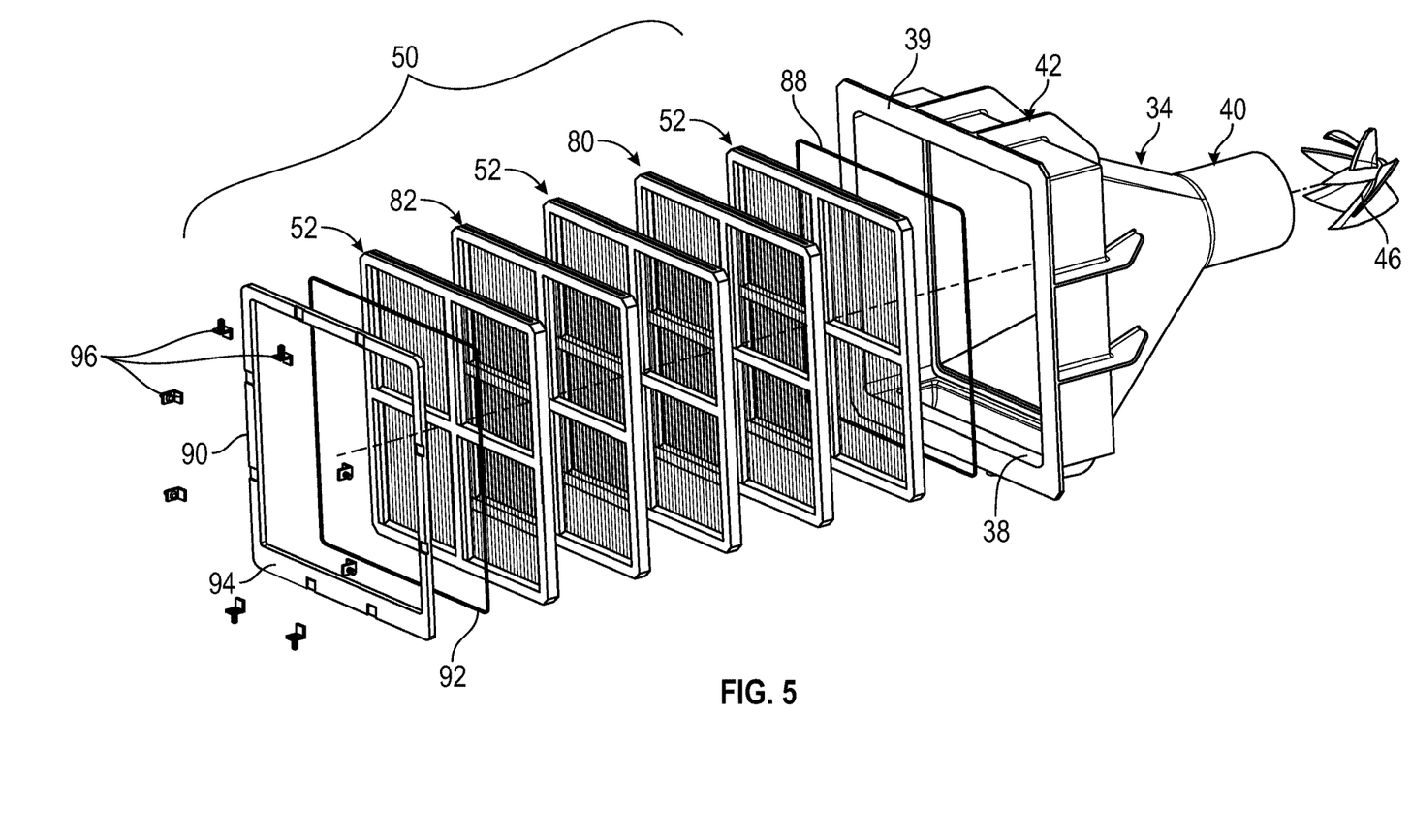
FIG. 5 is an exploded perspective view of a fog harvester assembly of a water extractor according to an embodiment.
Figure 6:
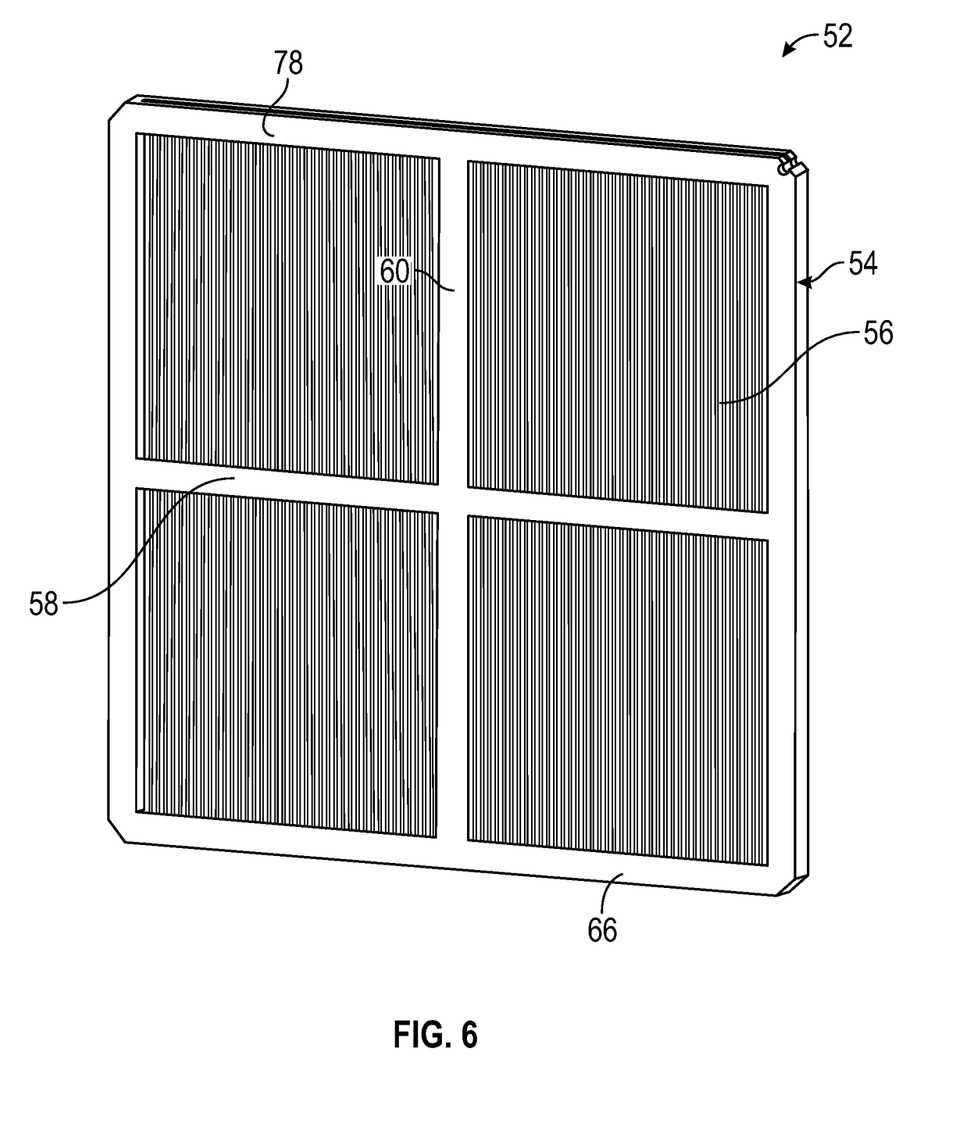
FIG. 6 is a perspective view of a fog harvester insert of a fog harvester assembly according to an embodiment.

With reference now to the FIG. 1, an exemplary portion of an environmental control system 20 is illustrated. As shown, the environmental control system (ECS) 20 includes an air cycle machine 22 having a turbine 24, and in some embodiments includes one or more other components, such as a compressor 26 and a fan 28 operably coupled to the turbine 24 by a rotatable shaft 30 for example. In the illustrated, non-limiting embodiment, the water extractor 32 is arranged downstream from the outlet of the turbine 24. However, it should be understood that embodiments where the water extractor 32 is arranged downstream from any suitable component of the ECS 20 are also contemplated herein. In an embodiment, the water extractor 32 is positioned within the ECS 20 to receive a flow of medium or air A that is cool and has condensed water vapor entrained or suspended therein resulting in a fog-like consistency.

With reference now to FIGS. 2-15, a non-limiting embodiment of a water extractor 32 is shown in more detail. The water extractor 32 includes a housing 34 having an inlet end 36 and an outlet end 38. As previously noted, the inlet end 36 may be configured to couple directly or indirectly to an outlet of a turbine. Similarly, the outlet end 38 may be configured to couple the housing 34 with a downstream component (not shown) of the ECS 20, such as a heat exchanger or a converging outlet header for example. In an embodiment, the outlet end 38 includes an outwardly extending flange 39 configured to facilitate a connection with the downstream component.

In the illustrated, non-limiting embodiment, the cross-sectional area of the housing 34 adjacent to or near the inlet end 36 is substantially smaller than the cross-sectional area of the housing at or adjacent to the outlet end 38. This change in the cross-sectional area is selected to cause a change in one or both of the pressure of the medium A and the speed of the medium A as is flows through the housing 34. Accordingly the configuration of the housing 34 may be selected in part to achieve a flow at the outlet end 38 or upstream from the outlet end 38 having a desirable speed associated with one or more downstream components of the ECS 20. However, embodiments where the cross-sectional area at the outlet end 38 is substantially equal to or only slightly larger than the cross-sectional area at the inlet end 36 are also within the scope of the disclosure.

As shown, the housing 34 may have a first portion 40 extending from the inlet end 36, and a second portion 42 extending from the first portion 40 to the outlet end 38. In an embodiment, the first portion 40 of the housing 34 has a substantially constant cross-sectional shape and area. In the illustrated, non-limiting embodiment, the first portion 40 of the housing 34 is cylindrical; however, a first portion 40 having any suitable configuration is contemplated herein. In an embodiment, a swirling mechanism 46 is arranged within the first portion 40 of the housing 34, such as at a location near the inlet end 36 for example. As shown, the swirling mechanism 46 may include one or more stationary swirl vanes 48 configured to impart a swirl or spin on the medium as it passes over the swirling mechanism 46. Imparting a swirl to the medium A within the housing 34 may enhance the distribution of the medium A, and in particular the water within the medium A, across the entire area of the housing 34.

The cross-sectional area and/or the cross-sectional shape of the second portion 42 of the housing 34 may vary over the axial length thereof. As a result of the change in the cross-sectional area of the second portion 42 of the housing 34 along the axis, the second portion 42 may form a diffuser reducing the velocity and increases the static pressure of the medium A. In an embodiment, the second portion 42 of the housing 34 has a generally rectangular cross-section such that the second portion 42 is substantially pyramidic in shape. Further, an angle of the sidewalls of the second portion 42 of the housing 34 may be equal to or greater than 14 degrees.

Further, the first portion 40 of the housing 34 may have a substantially different configuration than the second portion 42 of the housing 34. Embodiments where the cross-sectional size and shape at a first end 44 (FIG. 2) of the second portion 42 of the housing 34 substantially mirrors the cross-sectional size and shape of the first portion 40 of the housing 34 are also contemplated herein. In such embodiments, the cross-sectional shape of the second portion 42 of the housing 34 may transition from a first shape, such as a circle for example, to a second shape, such as a rectangle for example. However, it should be understood that a housing 34 having any suitable configuration, including any cross-sectional shape at any location, such as circular, square, triangular, or polygonal for example, is contemplated herein.

Mounted within the housing 34, near the outlet end 38 (see FIGS. 2 and 8), is a fog harvester assembly 50 including at least one fog harvester insert 52. In the illustrated, non-limiting embodiment of FIGS. 4, 5, 9 and 10, the fog harvester assembly 50 includes three fog harvester inserts 52. However, it should be understood that a fog harvester assembly 50 having any number of fog harvester inserts, including a single fog harvester insert, two fog harvester inserts, or more than three fog harvester inserts for example, are within the scope of the disclosure. In embodiments including multiple fog harvester inserts, the plurality of fog harvester inserts are stacked relative to one another along the axis of the housing 34, such that the medium is configured to flow through the plurality of fog harvester inserts in series. Further, in embodiments including multiple fog harvester inserts, the configuration of each of the plurality of fog harvester inserts may be substantially identical, or alternatively, may be different.

Each fog harvester insert 52 includes a frame 54 and a condensing material 56 installed about the frame 54. The frame 54 may be formed in any suitable manner including, but not limited to cast, injection molded, additively formed, and machined for example. As shown, a plurality of horizontal supports and vertical supports form a periphery of the frame 54. In an embodiment, best shown in FIGS. 6 and 10, the frame 54 additionally includes at least one centrally located horizontal support 58 extending between opposite vertical sides of the frame 54 and at least one centrally located vertical support 60 extending between opposite horizontal sides of the frame 54. The centrally located supports 58, 60 may be arranged at adjacent a single side of the condensing material 56, or alternatively, may be disposed on opposing sides of the condensing material 56. However, embodiments where the centrally located 58, 60 supports have another configuration, such as an x-shaped configuration extending between the corners of the frame 54 for example, are also within the scope of the disclosure.

Figure 7A:
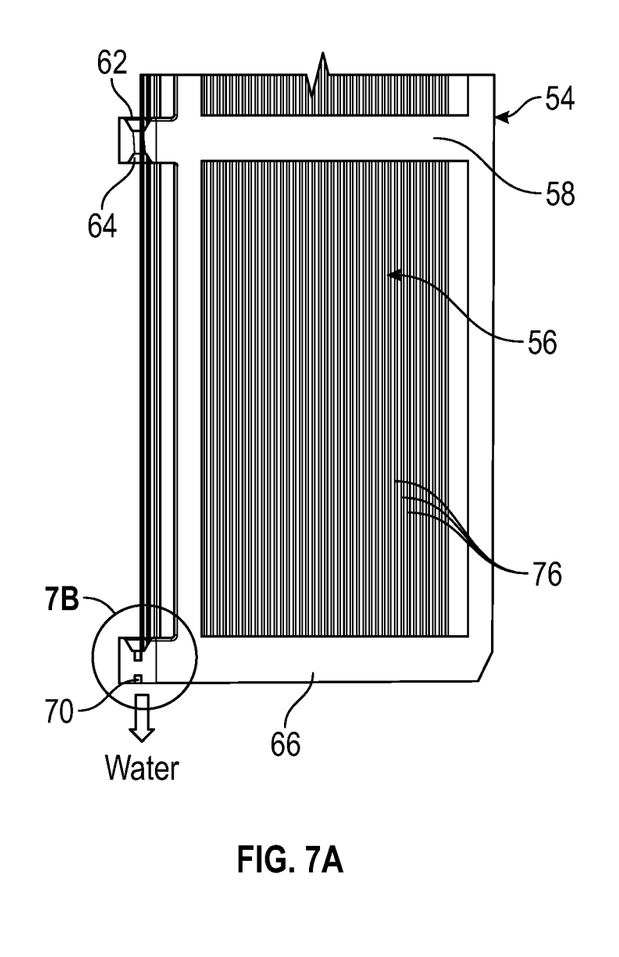
FIG. 7A is a perspective, partial cross-sectional view of the fog harvester insert of FIG. 6 according to an embodiment.
Figure 7B:
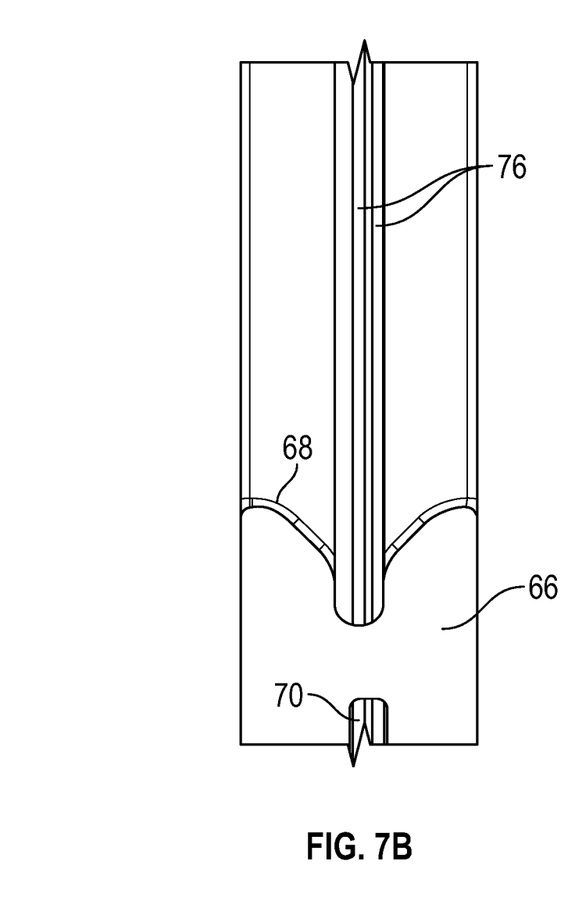
FIG. 7B is a detailed view of a portion of the fog harvester insert of FIG. 7A according to an embodiment.
Figure 8:
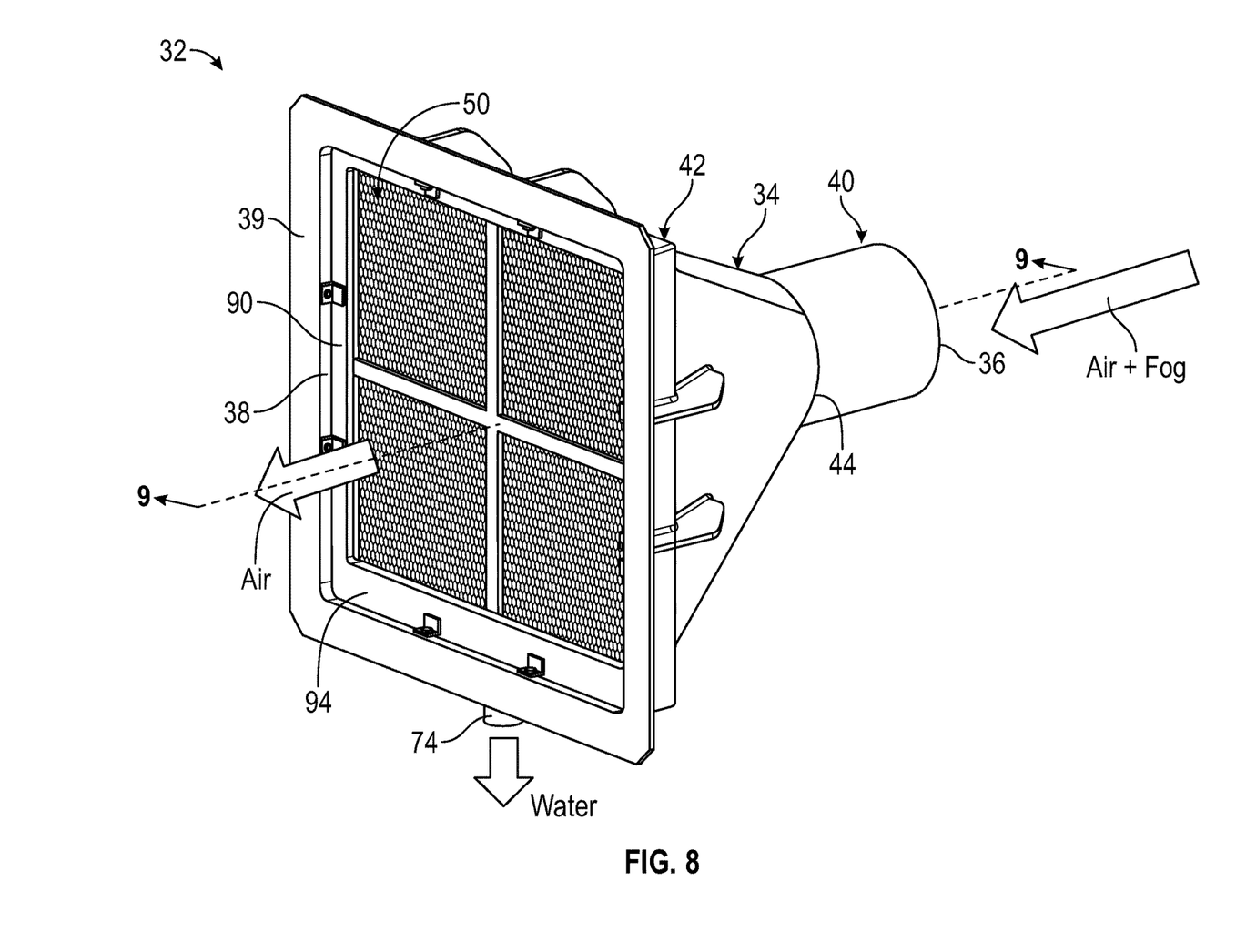
FIG. 8 is a perspective view of a water extractor of an environmental control system according to an embodiment.
Figure 9:
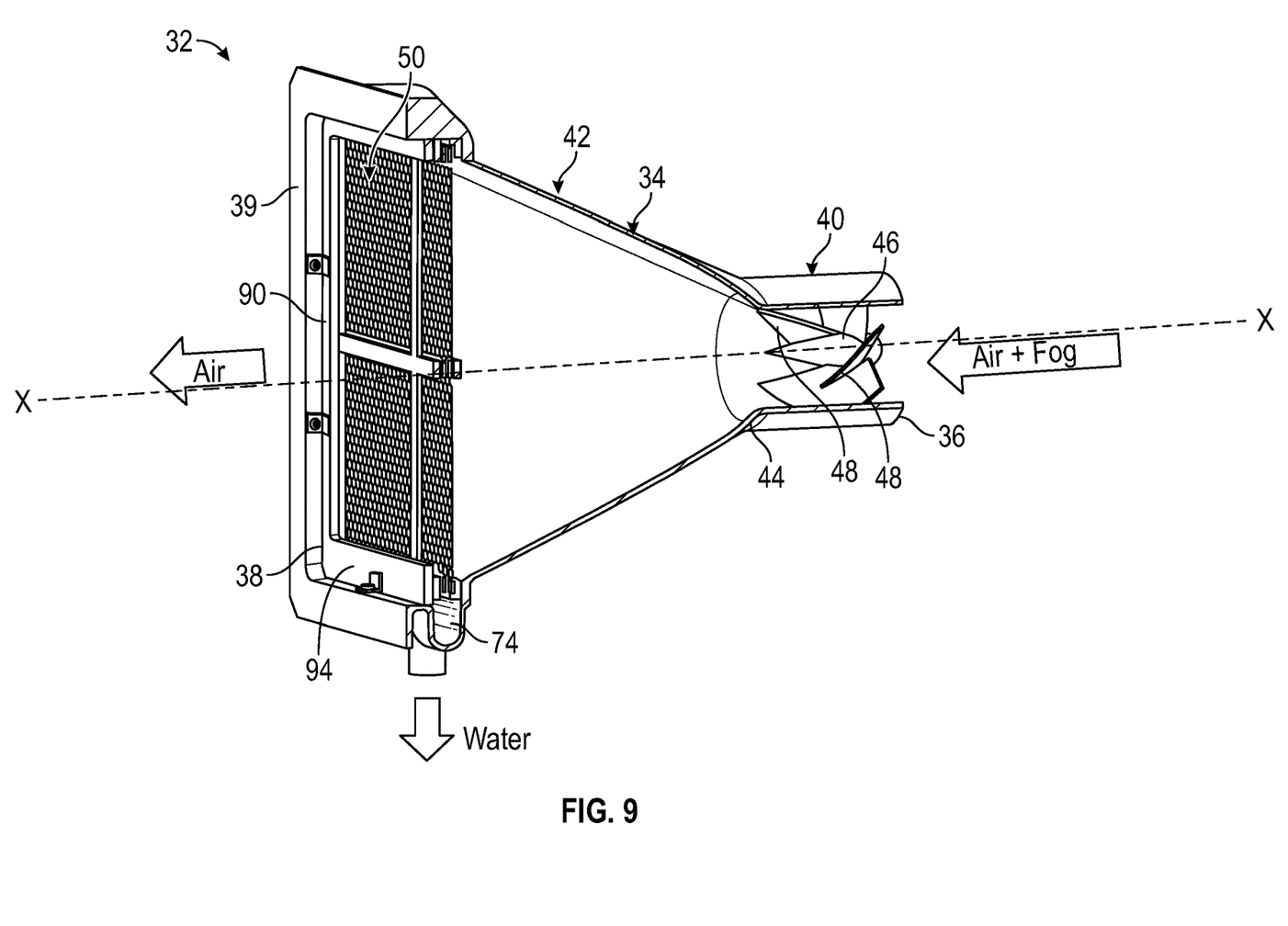
FIG. 9 is a cross-sectional view of the water extractor of FIG. 8 according to an embodiment.

With reference now to FIG. 7, at least one of the upper and lower surfaces of one or more of the horizontally oriented supports of the frame 54 may have a contoured, for example tapered, configuration. For example, in the illustrated non-limiting embodiment, the centrally located horizontal support 58, has a tapered upper surface 62 and lower surface 64. Similarly, the horizontal support 66 arranged at the bottom of the frame 54 has a contoured upper surface 68. This tapered configuration may facilitate installation of the condensing material 56 relative to the frame 54. Further, the contour of the upper surface 68 of the horizontal support 66 at the bottom of the frame 54 may facilitate the receipt of condensation therein, by directing condensation inwardly and downwardly towards the bottom of the frame 54. In an embodiment, best shown in FIGS. 7B, 12 and 13, one or more holes 70 are formed at the bottom surface 72 of the frame 54 to fluidly couple the bottom of the frame 54 with a sump or drain 74 (see FIGS. 4 and 9) formed in an adjacent surface of the housing 34. The at least one hole 70 may include a plurality of individual holes (FIG. 7B), such as spaced over a width of the frame 54 for example, or alternatively, may include one or more elongated slots (FIG. 13) extending over a portion or a substantial entirety of the width of the frame 54.

With continued reference to FIGS. 2-7, in the illustrated, non-limiting embodiment, the condensing material 56 includes a plurality of wires 76 arranged in an array. Accordingly, in such embodiments, a fog harvester insert 52 having a wire array may also be referred to herein as a "fog harp insert." The wires 76 may be mounted relative to the frame 54 in a vertical orientation such that the wires 76 are parallel to one another and a first end of each wire 76 is coupled to a first end or top 78 of the frame and a second end of each wire is coupled to a second, opposite end or bottom 66 of the frame 54. However, embodiments where the wires 76 have another orientation are also contemplated herein.

The plurality of wires 76 within the array may be made of any suitable material. Examples of suitable materials include, but are not limited to steel, steel alloys, copper, aluminum, other metals or metal alloys, composites, nylon, polyester, rayon, or another suitable polymer or plastic material, or any combination thereof. As shown, the wire array associated with each fog harvester insert 52 includes a plurality of rows of wires or strings 76 arranged in series relative to the flow through the housing 34. Although two rows of wires 76 are shown (FIG. 7B), it should be understood that an insert 52 having any number of rows of strings, including three rows, four rows, five rows, or more than five rows for example, are contemplated herein. Although the plurality of wires 76 within the array are illustrated as being substantially identical, it should be understood that in other embodiment, the diameter of the plurality of wires 76 within the array may vary.

The wires 76 within each row of the array are separated from one another by a distance such that no two wires 76 within the array contact one another. The pitch or distance between two wires 76 in the array within the same row may be about double the diameter of the wires 76. For example, in embodiments where the wires 76 have a diameter of about 0.031 inches, the distance between the wires 76 may be about 0.062 inches. However, embodiments where the pitch is more than double the diameter of the wire 76, and also embodiments where the pitch is less than double the diameter of the wire 76, are within the scope of the disclosure. In addition to being axially spaced from an adjacent row of wires 76, in an embodiment, the wires 76 within each row are staggered or horizontally offset from the wires 76 in the adjacent rows, thereby reducing the horizontal width of the clearances formed within the insert 52.

In the illustrated, non-limiting embodiment of FIGS. 2-7B, the plurality of fog harvester inserts 52 within the fog harvester assembly 50 are separated from one another by a distance. As shown, a spacer 80, such as a frame for example, may be arranged between adjacent fog harvester inserts 52. In the illustrated, non-limiting embodiment, the spacer 80 is substantially identical to the frame 54 of a fog harvester insert 52. However, embodiments where a spacer 80 having a different configuration is used are also contemplated herein.

Another example of a fog harvester assembly 50 is illustrated in FIGS. 8-13. In this embodiment, the condensing material 56 includes at least one layer of mesh or screen-like material 82 having small holes formed therein (see FIG. 11A). A fog harvester insert 52 having a mesh configuration may also be referred to herein as a fog mesh insert. In an embodiment, the condensing material 56 includes a plurality of layers of screen-like material 82 arranged in an overlapping relationship (see FIG. 11B). In the illustrated, non-limiting embodiment, the insert 52 includes three layers of screen-like material 82. However, it should be understood that any number of layers of screen-like material 82, such as two layers, four layers, five layers, or more than five layers are also contemplated herein.

The plurality of layers that form the condensing material 56 may be substantially identical in configuration or may vary. For example, one or more of the layers may include a diamond-like screen material. Further, the openings of one of the layers of screen-like material 82 may be vertically and/or horizontally offset from an adjacent layer of screen-like material 82. Inclusion of this offset may maximize the ability for the fog droplets within the medium A to attach to and to flow downwards along the screen-like material 82 toward the drain 74.

Figure 10:
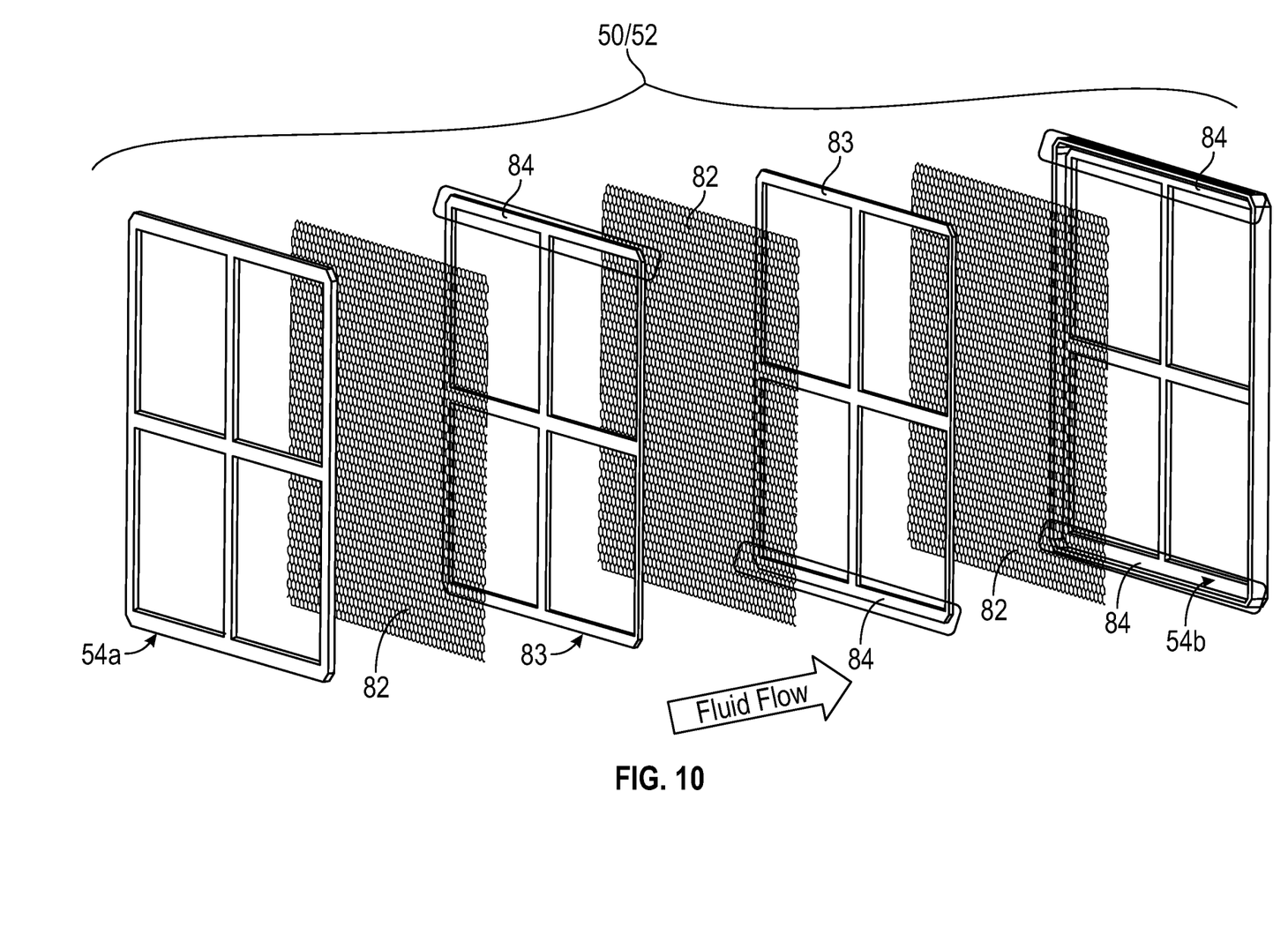
FIG. 10 is an exploded perspective view of the fog harvester assembly of FIG. 9 according to an embodiment.
Figure 11A:
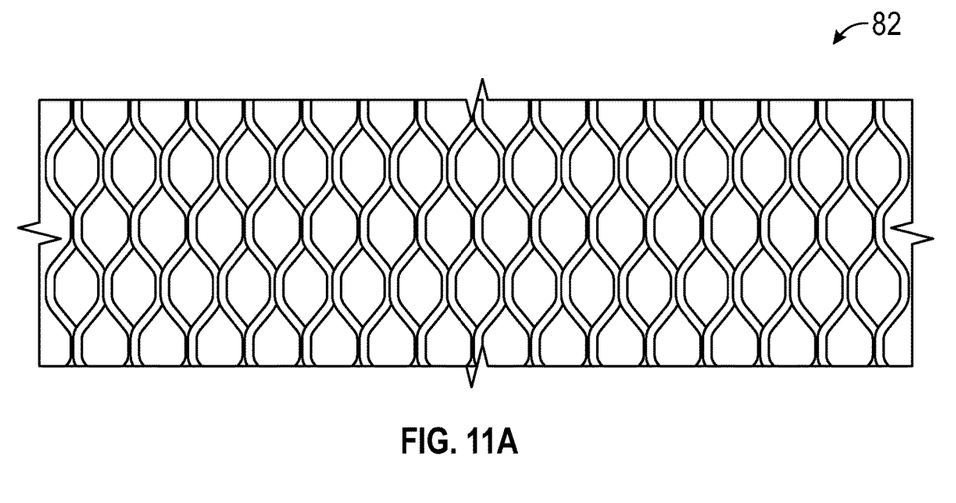
FIG. 11A is a front view of a layer of screen-like material of the fog harvester insert according to an embodiment.
Figure 11B:
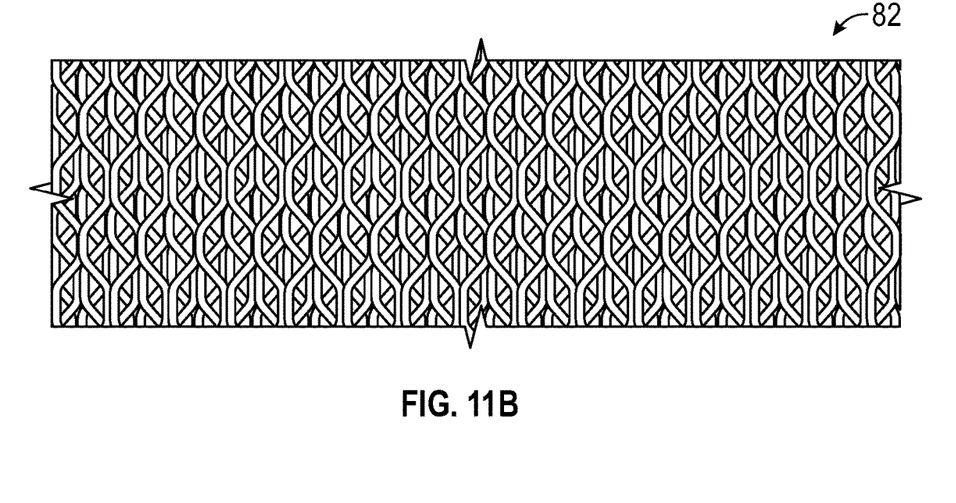
FIG. 11B is a front view of a plurality of stacked layers of screen-like material of the fog harvester insert according to an embodiment.
Figure 12:
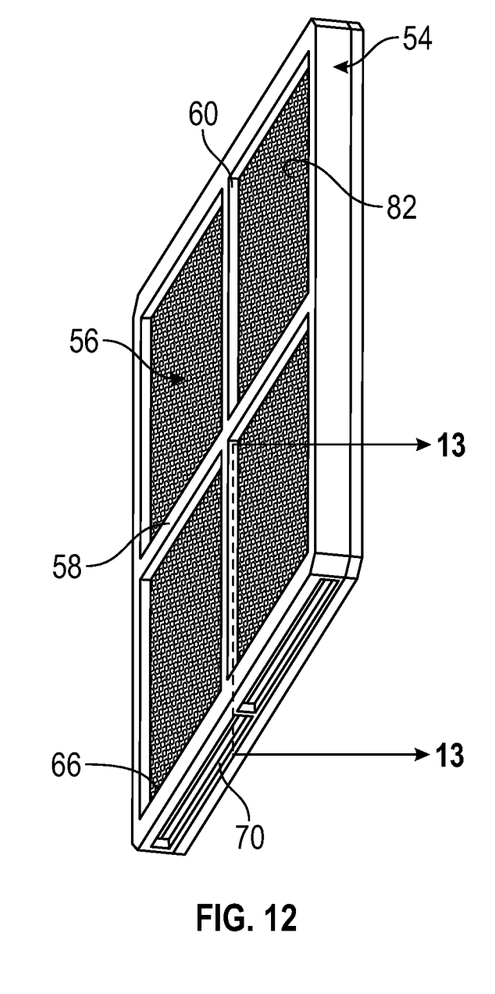
FIG. 12 is a perspective view of a fog harvester insert of a fog harvester assembly according to an embodiment.
Figure 13:
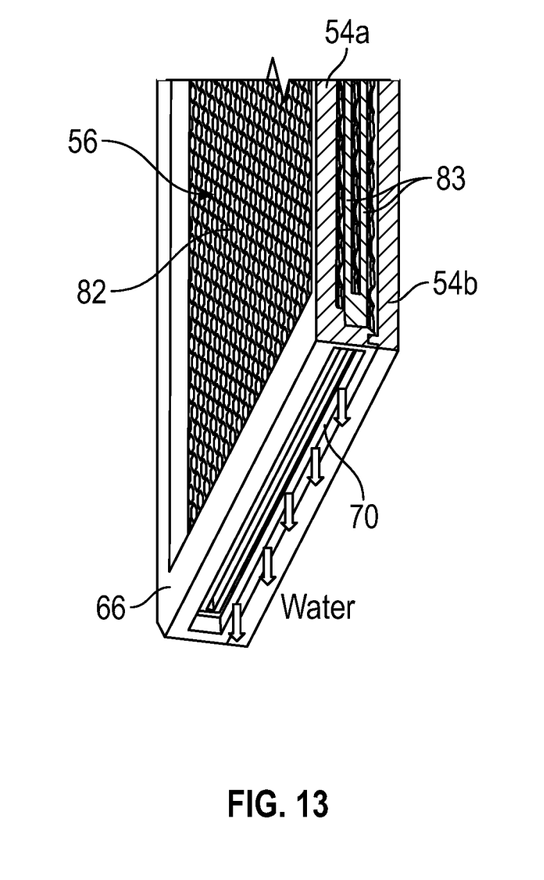
FIG. 13 is a perspective, partial cross-sectional view of the fog harvester insert of FIG. 12 according to an embodiment.

In an embodiment, best shown in FIG. 10, each layer of screen-like material 82 is separated from an adjacent layer of screen-like material. In an embodiment, at least one spacer, illustrated at 83, are disposed between adjacent layers. For example, a first layer of screen-like material is attached to a first portion of a frame 54. Further, an opposite side of the first layer of screen-like material 82 may be attached to a spacer 83, such that the first layer is sandwiched between the first portion of the frame 54a and a first spacer 83. As shown, a second layer of screen-like material 82 may be arranged between the first and second spacers 83, and a third layer of screen-like material may be positioned between the second spacer 83 and a second portion of the frame 54b. In embodiments, where the one or more layers of screen-like material 82 and one or more spacers 83 are disposed between multiple frame portions, the frame portions may be connectable to one another via a press fit or snap fit connection.

In the illustrated, non-limiting embodiment, each layer of the screen-like material 82 within a fog harvester insert 52 is vertically offset from an adjacent layer of screen-like material 82 within the fog harvester insert 52. In an embodiment, the second layer of screen-like material 82 is vertically offset from the first layer of screen-like material 82 in a first direction, and the third layer of screen-like material 82 is vertically offset from the second layer of screen-like material 82 in either the same first direction, or alternatively, in a second, opposite direction. In an embodiment, a bottom of each of the layers of screen-like material 82 is arranged in a different plane (see FIG. 13). To achieve this vertical offset, a feature 84, such as a vertical spacer for example, may be located at or integrally formed with one or more of the frame portions 54a, 54b or spacers 83 of the fog harvester insert 52. As shown, the feature 84 may be located near the top 78 and/or near the bottom 66 of the frame portion 54a, 54b or spacer 83.

Although the fog harvester assembly 50 of FIGS. 8-13 is illustrated as having a single fog harvester insert 52, it should be understood that embodiments having multiple fog harvester inserts 52 arranged in series relative to the flow of the medium A are also contemplated herein.

With continued reference to FIGS. 2-13, in an embodiment, the housing 34 is contoured or has an internal flange 86 (best shown in FIG. 3) arranged near the outlet end 38, for example near a downstream end of the diffuser of the housing 34, and configured to support an internal end of the fog harvester assembly 50. The fog harvester assembly 50 may be sealed against the flange 86 such as via an O-ring type seal 88 for example. Similarly, an end plate 90 may be arranged in overlapping relationship with the end of the fog harvester assembly 50 located adjacent to the outlet end 38 of the housing 34. The end plate 90 has a substantially hollow center, similar to a frame 54 or spacer 80, to reduce interference with the flow output from the housing 34. In an embodiment, a seal 92, such as an O-ring type seal for example, is positioned between the fog harvester assembly 50 and the end plate 90. The seal 92 may, but need not be substantially identical to seal 88.

A vertical height of a bottom lip 94 of the end plate 90 may be greater than the vertical height of the bottom horizontal support 66 of the frames 54 and/or spacers 80 of the fog harvester inserts 52. As a result, the bottom lip 94 of the end plate 90 prevents any condensation collected near the bottom of the frame of the fog harvester inserts from becoming entrained in the airflow at the outlet end 38.

When installed, the condensing material 56 of the one or more fog harvester inserts 52 of the fog harvester assembly 50 extend generally vertically such that any moisture that collects on the condensing material will fall via gravity towards the one or more holes 70 at the bottom 66 of the frame 54. Although the inserts 52 are generally described herein such that the condensing material 56 has a vertical orientation, embodiments where the condensing material 56 is arranged at a non-vertical angle relative to the longitudinal axis of the housing 34 are also within the scope of the disclosure.

A plurality of fasteners, illustrated at 96, may be used to couple the end plate 90 to a surface of the housing 34. Although clips that use a threaded connection are illustrated in the FIGS., any suitable fastener is within the scope of the disclosure. When installed, movement of the fog harvester assembly 50 relative to the housing 34 is restricted by the internal flange 86 and the clips 96.

In operation, the medium A is provided to the inlet end 36 of the water extractor 32. Within the water extractor 32, a swirl is imparted to the medium A via the swirling mechanism, causing the medium A to distribute within the housing 34, and in particular within the second portion 42 of the housing 34. As the medium A flows through the one or more fog harvester inserts 52 of the fog harvester assembly 50, water droplets collect on the surface of the condensing material 56, or between adjacent layers of the condensing material 56, such as between two or more parallel wires 76 for example. As a result, the medium A output from the water extractor 32 is dried or dehumidified compared to the inlet air. When the droplets reach a sufficient size or volume, the gravitational force acting on thereon will cause the droplets to slide down the condensing material 56 to the bottom of the frame 54. At the bottom of the frame 54, the water passes through the one or more holes 70 and drips from the end of the insert 52 into the drain 74 disposed vertically underneath the fog harvester assembly 50. From the drain 74, the water can be exhausted overboard, or alternatively, can be redirected to another component of the ECS 20, or alternatively, to another system or component of the aircraft.

Because the water extractor 32 illustrated and described herein is intended to coalesce and collect the moisture within the medium A, use of a water extractor 32 as described herein may minimize or even eliminate the need for a separate condenser located upstream from the water extractor 32 within the environmental control system.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water extractor for use in an environmental control system, the water extractor comprising:
 a housing having an inlet end and an outlet end;
 a swirling mechanism mounted within the housing; and
 a fog harvester assembly mounted within the housing at a location between the inlet end and the outlet end, the swirling mechanism being arranged at a location upstream from the fog harvester assembly relative to a flow through the housing, wherein the fog harvester assembly includes at least one fog harvester insert, the at least one fog harvester insert including a frame and a condensing material coupled to the frame, wherein the condensing material is at least one of:
 a wire array including a plurality of wires arranged in at least two rows of wires, each of the plurality of wires within the wire array being separated from a remainder of the plurality of wires; and
 at least one layer of screen-like material, wherein the at least one layer of screen-like material includes a diamond-like screen material.

2. The water extractor of claim 1, wherein the housing includes a diffuser, the fog harvester assembly being arranged at a downstream end of the diffuser.

3. The water extractor of claim 1, wherein the fog harvester assembly includes a plurality of fog harvester inserts.

4. The water extractor of claim 3, wherein the plurality of fog harvester inserts are separated from one another along an axis of the housing such that a medium is configured to pass through the plurality of fog harvester inserts in series.

5. The water extractor of claim 1, wherein the at least one layer of the screen-like material includes a plurality of layers of screen-like material and adjacent layers of the plurality of layers of screen-like material are vertically offset from one another.

6. The water extractor of claim 5, wherein the at least one fog harvester insert further comprises at least one spacer arranged between adjacent layers of the plurality of layers of screen-like material.

7. The water extractor of claim 1, wherein the frame further comprises a bottom horizontal support having one or more holes formed therein.

8. The water extractor of claim 7, wherein an upper surface of the bottom horizontal support is contoured to direct water droplets toward the one or more holes.

9. An environmental control system of a vehicle comprising:
 a turbine;
 a water extractor arranged downstream from and in fluid communication with the turbine relative to a flow of medium, the water extractor comprising:
 a housing having an inlet end-and, an outlet end, and a diffuser; and
 a fog harvester assembly mounted within the housing at a location between the inlet end and the outlet end, the fog harvester assembly being arranged at a downstream end of the diffuser.

10. The environmental control system of claim 9, wherein the vehicle is an aircraft.

11. The environmental control system of claim 9, further comprising a swirling mechanism mounted within the housing, upstream from the diffuser.

12. The environmental control system of claim 9, wherein the fog harvester assembly includes at least one fog harvester insert, the at least one fog harvester insert including a frame and a condensing material coupled to the frame.

13. The environmental control system of claim 12, wherein the fog harvester assembly includes a plurality of fog harvester inserts arranged in series relative to the flow of medium.

14. A water extractor for use in an environmental control system, the water extractor comprising:
 a housing having an inlet end and an outlet end;
 a swirling mechanism mounted within the housing; and
 a fog harvester assembly mounted within the housing at a location between the inlet end and the outlet end, the at least one fog harvester assembly including:
 at least one fog harvester insert having a frame and a condensing material coupled to the frame and the frame includes a bottom horizontal support having one or more holes formed therein.

* * * * *